US010928914B2

(12) United States Patent
Ng et al.

(10) Patent No.: US 10,928,914 B2
(45) Date of Patent: Feb. 23, 2021

(54) INDIVIDUALLY INTERACTIVE MULTI-VIEW DISPLAY SYSTEM FOR NON-STATIONARY VIEWING LOCATIONS AND METHODS THEREFOR

(71) Applicant: Misapplied Sciences, Inc., Redmond, WA (US)

(72) Inventors: Albert Han Ng, Redmond, WA (US); Paul Henry Dietz, Redmond, WA (US); David Steven Thompson, Redmond, WA (US)

(73) Assignee: Misapplied Sciences, Inc., Redmond, WA (US)

( * ) Notice: Subject to any disclaimer, the term of this patent is extended or adjusted under 35 U.S.C. 154(b) by 664 days.

(21) Appl. No.: 15/002,175

(22) Filed: Jan. 20, 2016

(65) Prior Publication Data

US 2017/0205889 A1 Jul. 20, 2017

Related U.S. Application Data

(60) Provisional application No. 62/109,570, filed on Jan. 29, 2015.

(51) Int. Cl.
*G06F 3/01* (2006.01)
*G09G 5/12* (2006.01)
(Continued)

(52) U.S. Cl.
CPC ............ *G06F 3/017* (2013.01); *G06F 1/1605* (2013.01); *G06F 3/012* (2013.01); *G06F 3/013* (2013.01);
(Continued)

(58) Field of Classification Search
CPC .......... G06Q 30/0261; G06Q 30/0268; H04N 13/0468; H04N 13/047; H04N 21/00;
(Continued)

(56) References Cited

U.S. PATENT DOCUMENTS

| 5,855,425 A | 1/1999 | Hamagishi |
| 6,339,421 B1 | 1/2002 | Puckeridge |

(Continued)

FOREIGN PATENT DOCUMENTS

| EP | 2685735 A1 | 1/2014 |
| JP | 2004-078125 | 3/2004 |

(Continued)

OTHER PUBLICATIONS

Authorized Officer: Jacinta Molloy, "International Search Report and Written Opinion" dated Sep. 29, 2016 in PCT Application No. PCT/US2016/037185.

(Continued)

*Primary Examiner* — Amr A Awad
*Assistant Examiner* — Aaron Midkiff
(74) *Attorney, Agent, or Firm* — Kaplan Breyer Schwarz, LLP

(57) ABSTRACT

A multi-view display system that permits viewers to individually interact therewith to communicate commands or viewing preferences is disclosed. Methods in accordance with the present teachings enable a multi-view display to deliver a unique content stream to each of plural viewers, based on the viewers' interactions with the multi-view display system, wherein the viewers are not in fixed locations.

29 Claims, 11 Drawing Sheets

(51) Int. Cl.
  *G06F 3/16*    (2006.01)
  *G09G 5/00*    (2006.01)
  *G06F 1/16*    (2006.01)
  *H04N 21/00*   (2011.01)
  *G06F 3/03*    (2006.01)

(52) U.S. Cl.
  CPC ............ *G06F 3/0304* (2013.01); *G06F 3/167* (2013.01); *G09G 5/00* (2013.01); *G09G 5/12* (2013.01); *H04N 21/00* (2013.01); *G09G 2320/0693* (2013.01); *G09G 2340/14* (2013.01); *G09G 2354/00* (2013.01); *G09G 2358/00* (2013.01)

(58) Field of Classification Search
  CPC ........ G06F 1/1605; G06F 3/012; G06F 3/013; G06F 3/017; G06F 3/0304; G06F 3/167; G09G 5/00; G09G 5/12; G09G 2320/0693; G09G 2340/14; G09G 2354/00; G09G 2358/00
  USPC ......................................................... 345/156
  See application file for complete search history.

(56) References Cited

U.S. PATENT DOCUMENTS

| | | | |
|---|---|---|---|
| 6,377,295 | B1 | 4/2002 | Woodgate et al. |
| 7,001,023 | B2 | 2/2006 | Lee et al. |
| 7,602,395 | B1 | 10/2009 | Diard |
| 7,990,498 | B2 | 8/2011 | Hong |
| 8,461,995 | B1* | 6/2013 | Thornton ........... G06Q 30/0268 235/378 |
| 9,080,219 | B2 | 7/2015 | Chang et al. |
| 9,080,279 | B2 | 7/2015 | Jun et al. |
| 9,715,827 | B2 | 7/2017 | Ng et al. |
| 9,743,500 | B2 | 8/2017 | Dietz et al. |
| 9,792,712 | B2 | 10/2017 | Ng et al. |
| 2003/0115096 | A1* | 6/2003 | Reynolds ............... G06Q 30/02 705/14.58 |
| 2003/0156260 | A1 | 8/2003 | Putilin et al. |
| 2004/0051644 | A1 | 3/2004 | Tamayama et al. |
| 2005/0195330 | A1 | 9/2005 | Zacks et al. |
| 2009/0273486 | A1 | 11/2009 | Sitbon |
| 2010/0085517 | A1 | 4/2010 | Hong |
| 2010/0207961 | A1 | 8/2010 | Zomet |
| 2010/0214537 | A1 | 8/2010 | Thomas |
| 2011/0159929 | A1 | 6/2011 | Karaoguz et al. |
| 2011/0216171 | A1 | 9/2011 | Barre et al. |
| 2011/0242298 | A1 | 10/2011 | Bathiche et al. |
| 2011/0304613 | A1 | 12/2011 | Thoresson |
| 2011/0310003 | A1 | 12/2011 | De La Barre |
| 2012/0026157 | A1 | 2/2012 | Unkel et al. |
| 2012/0062565 | A1 | 3/2012 | Fuchs et al. |
| 2012/0105445 | A1 | 5/2012 | Sakai et al. |
| 2012/0140048 | A1* | 6/2012 | Levine ............... H04N 13/0059 348/51 |
| 2012/0218253 | A1 | 8/2012 | Clavin |
| 2013/0093752 | A1 | 4/2013 | Yuan |
| 2013/0114019 | A1 | 5/2013 | Ijzerman et al. |
| 2013/0169765 | A1 | 7/2013 | Park et al. |
| 2014/0015829 | A1 | 1/2014 | Park et al. |
| 2014/0035877 | A1 | 2/2014 | Cai et al. |
| 2014/0111101 | A1 | 4/2014 | McRae |
| 2014/0118403 | A1 | 5/2014 | Verthein et al. |
| 2014/0310271 | A1 | 10/2014 | Song et al. |
| 2015/0020135 | A1 | 1/2015 | Frusina et al. |
| 2015/0042771 | A1 | 2/2015 | Jensen et al. |
| 2015/0049176 | A1 | 2/2015 | Hinnen et al. |
| 2015/0062314 | A1 | 3/2015 | Itoh |
| 2015/0085091 | A1 | 3/2015 | Varekamp |
| 2015/0092026 | A1 | 4/2015 | Baik et al. |
| 2015/0198940 | A1 | 7/2015 | Hwang et al. |
| 2015/0279321 | A1 | 10/2015 | Falconer et al. |
| 2015/0334807 | A1 | 11/2015 | Gordin et al. |
| 2016/0012726 | A1 | 1/2016 | Wang |
| 2016/0027029 | A1 | 1/2016 | Poole |
| 2016/0210100 | A1 | 7/2016 | Ng et al. |
| 2016/0212417 | A1 | 7/2016 | Ng et al. |
| 2016/0224122 | A1 | 8/2016 | Dietz et al. |
| 2016/0227200 | A1 | 8/2016 | Reitterer et al. |
| 2016/0227201 | A1 | 8/2016 | Ng et al. |
| 2016/0261837 | A1 | 9/2016 | Thompson et al. |
| 2016/0261856 | A1 | 9/2016 | Ng et al. |
| 2016/0293003 | A1 | 10/2016 | Ng et al. |
| 2016/0341375 | A1 | 11/2016 | Baker |
| 2016/0341377 | A1 | 11/2016 | Eddins |
| 2016/0366749 | A1 | 12/2016 | Dietz et al. |
| 2016/0371866 | A1 | 12/2016 | Ng et al. |
| 2017/0124204 | A1 | 5/2017 | Gossweiler et al. |
| 2017/0205889 | A1 | 7/2017 | Ng et al. |

FOREIGN PATENT DOCUMENTS

| | | |
|---|---|---|
| JP | 2012-010086 | 1/2010 |
| JP | 2012-042507 | 3/2012 |
| JP | 2014-178366 | 9/2014 |
| WO | 0224470 A | 3/2002 |
| WO | 2013183108 A1 | 12/2013 |

OTHER PUBLICATIONS

"Office Action" dated Oct. 6, 2016 in U.S. Appl. No. 15/060,527.
"Non-Final Office Action" dated Jan. 31, 2017, U.S. Appl. No. 15/180,341.
Officer: Patricia Stein, "International Search Report and Written Opinion", dated Jun. 3, 2016, issued in related PCT Application: PCT/US2016/04122.
"Non-Final Office Action", U.S. Appl. No. 15/002,158, dated Mar. 3, 2017, p. 19.
"Notice of Allowance and Fees Due", U.S. Appl. No. 15/180,341, dated Jul. 11, 2017, 7 pp.
Authorized Officer: Mehrdad Dastouri, "International Preliminary Report on Patentability" dated Feb. 3, 2017 issued in PCT International Application PCT/US16/14122, 21 pp.
"Non-Final Office Action", dated Mar. 22, 2017, Issued in related U.S. Appl. No. 15/002,164, 28 pp.
Officer: Jeffrey Harold, "International Preliminary Report on Patentability", Completed Mar. 20, 2017, Issued in International Patent Application PCT/US2016/020784, 6 pp.
"Notice of Allowance", Issued in U.S. Appl. No. 15/184,874, dated Sep. 8, 2017, 14 pp.
"Final Office Action", U.S. Appl. No. 15/002,164, dated Oct. 5, 2017, 27 pp.
"Non-Final Office Action", U.S. Appl. No. 15/002,014, dated Oct. 27, 2017, 11 pp.
"Final Office Action", U.S. Appl. No. 15/015,099, dated Nov. 13, 2017, 14 pp.
Officer: Patricia Stein, "International Search Report and Written Opinion", dated May 12, 2016, issued in related PCT Application: PCT/US2016/020784.
"Non-Final Office Action" in U.S. Appl. No. 15/062,103 dated Feb. 14, 2018.
"Non-Final Office Action" dated Feb. 8, 2018 in U.S. Appl. No. 15/060,527.
"Non Final Office Action" dated Apr. 4, 2018 in U.S. Appl. No. 15/002,158, p. 23.
"Non-Final Office Action", U.S. Appl. No. 15/060,527, dated May 19, 2017, 13 pp.
"Non-Final Office Action", Related U.S. Appl. No. 15/184,874, dated May 22, 2017, 19 pp.
"Non-Final Office Action", Related U.S. Appl. No. 15/015,099, dated May 4, 2017, 9 pp.
"Non-Final Office Action", dated Mar. 24, 2017, Issued in related U.S. Appl. No. 15/002,175, 26 pp.
"Non-Final Office Action", dated Jan. 26, 2017, issued in U.S. Appl. No. 15/088,912.
Non-Final Office Action received for U.S. Appl. No. 15/062,103 dated Oct. 11, 2018, 9 pages.

(56) References Cited

OTHER PUBLICATIONS

Non-Final Office Action received for U.S. Appl. No. 15/015,099 dated Oct. 12, 2018, 6 pages.
Final Office Action received for U.S. Appl. No. 15/060,527 dated Oct. 5, 2018, 14 pages.
Final Office Action received for U.S. Appl. No. 15/002,158 dated Oct. 5, 2018, 22 pages.
Applicant Initiated Interview Summary received for U.S. Appl. No. 15/002,014, dated Dec. 26, 2019, 1 page.
Decision to grant a European patent dated May 28, 2020 for EP Application No. 16707570.
English Translation of Chinese Office Action dated Oct. 8, 2019 in Chinese Patent Application No. 2016800127601.
English Translation of Office Action dated Dec. 3, 2019 in Japanese Patent Application No. 2017-546647.
Final Rejection received for U.S. Appl. No. 15/002,014, dated Jul. 1, 2019, 12 pages.
Non-Final Office Action received for U.S. Appl. No. 15/944,366, dated Apr. 9, 2020, 25 pages.
Non-Final Rejection dated Aug. 27, 2020 for U.S. Appl. No. 16/448,549.
Non-Final Rejection received for U.S. Appl. No. 15/410,508, dated May 24, 2019, 12 pages.
Notice of Allowance received for U.S. Appl. No. 15/002,014, dated Feb. 13, 2020, 9 pages.
Notice of Allowance received for U.S. Appl. No. 15/410,508, dated Dec. 30, 2019, 8 pages.
Office Action received for European Patent Application No. 16714615.8, dated Aug. 9, 2019, 5 pages.
Office Action received for European Patent Application No. 16714615.8, dated Mar. 23, 2020, 4 pages.
Office Action received for European Patent Application No. 16714615.8, dated Oct. 10, 2018, 4 pages.
Office Action issued in European patent application No. 16714615.8, dated Aug. 9, 2019, 5 pp.
Notice of Allowance and Fees Due (PTOL-85) received for U.S. Appl. No. 15/060,527, dated Mar. 14, 2019, 8 pages.
Notice of Allowance and Fees Due (PTOL-85) received for U.S. Appl. No. 15/015,099, dated Dec. 18, 2018, 5 pages.
Non-Final Rejection received for U.S. Appl. No. 15/002,014, dated Jan. 15, 2019, 18 pages.
Final Rejection received for U.S. Appl. No. 15/944,366, dated Nov. 14, 2018, 26 pages.
Examiner initiated interview summary (PTOL-413B) received for U.S. Appl. No. 15/060,527, dated Jan. 30, 2019, 2 pages.
Advisory Action (PTOL-303) received for U.S. Appl. No. 15/944,366, dated Feb. 20, 2019, 3 pages.
Advisory Action (PTOL-303) received for U.S. Appl. No. 15/060,527 , dated Jan. 30, 2019, 3 pages.
Advisory Action (PTOL-303) received for U.S. Appl. No. 15/002,158, dated Dec. 20, 2018, 4 pages.

* cited by examiner

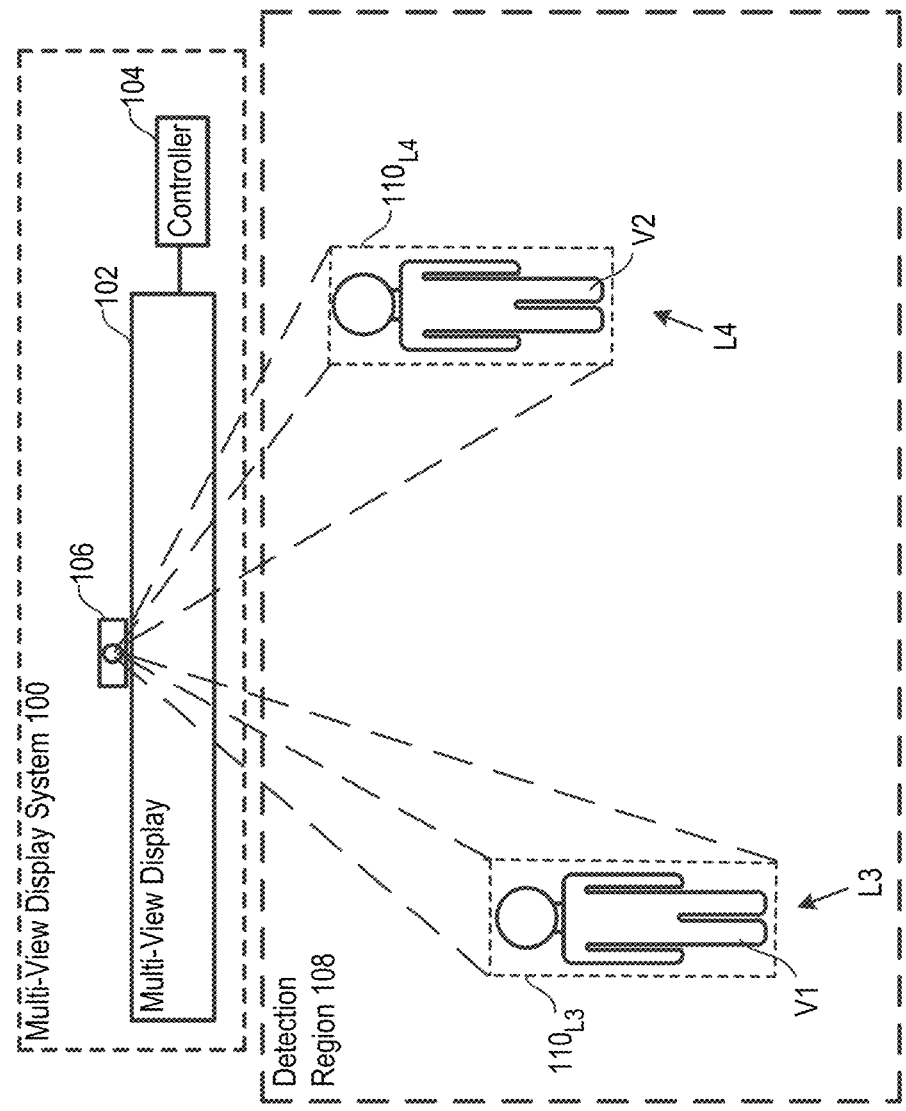

INDIVIDUALLY INTERACTIVE MULTI-VIEW DISPLAY SYSTEM FOR NON-STATIONARY VIEWING LOCATIONS AND METHODS THEREFOR

STATEMENT OF RELATED CASES

This case claims priority of U.S. Patent Application Ser. 62/109,570 filed Jan. 29, 2015 and is incorporated herein by reference. This case is also related to the following U.S. patent applications, all of which were filed on even date herewith and all of which are incorporated by reference. To the extent there are any inconsistencies between the language used in this disclosure and the language used in Ser. 62/109,570 or the cases listed below, the language used in this disclosure controls:

"Method for Calibrating a Multi-view Display";
"Differentiated Content Delivery System and Method Therefor"; and
"Individually Interactive Multi-View Display System and Methods Therefor".

FIELD OF THE INVENTION

This disclosure pertains to multi-view displays.

BACKGROUND OF THE INVENTION

A multi-view display can present a different image to each one of plural viewers that are at different viewing locations with respect to the display. For example, Sharp Corporation and Microsoft Corporation have developed displays that are capable of showing a small number of independent views based on the viewer's angle with respect to the display. Viewers can interact with these displays using standard control devices. For example, there might be separate game controllers for a left view and a right view.

Advances in technology are expected to result in next-generation MVDs that would enable hundreds to thousands of people to simultaneously view a single display yet each see something different. These devices will operate by controlling the images presented at different viewing locations, each of which locations having a unique viewing angle with respect to each pixel in the MVD.

The ability to present, on a single viewing screen, different images to different viewers based on their viewing location presents interesting possibilities.

SUMMARY OF THE INVENTION

A multi-view display (MVD) possesses the ability to present, on a single viewing screen, different images to different viewers based on a difference in each viewers' viewing location. The inventors recognized that this unique ability of an MVD could be leveraged to great benefit if each viewer could individually interact with the system. Based on that recognition, the inventors sought to develop systems and methods by which individual interactions can be associated with each viewpoint (i.e., viewing location or viewer) to thereby enable simultaneous, mass, personalized interaction with an MVD.

The present invention provides a way for viewers to individually interact with an MVD system, such as, for example, to communicate commands or viewing preferences. Methods in accordance with the present teachings enable an MVD to deliver a unique content stream to each of plural viewers, wherein the viewers are not in fixed locations.

In the illustrative embodiment, an individually interactive MVD system in used in the context of advertising, such as to provide an improved product display in a retail store.

In accordance with the illustrative embodiment, an MVD system includes at least one MVD, a system controller, and a sensing system. Each viewer is able to interact with the MVD system by making gestures that are captured by the sensing system. The gestures convey information; that is, viewer commands/preferences pertaining to content of interest to the viewer.

The MVD system, via the sensing system and appropriate software running on the system controller, is capable of detecting the presence and location of each viewer in a detection region, associating the gestures with one or more gesticulating viewers, and interpreting the gestures. The MVD system is further capable of generating appropriate content updates for each viewer based on the interpreted gestures and causing the display to present the updated content to each viewer at their respective locations.

In accordance with the illustrative embodiment, the delivery location of each content stream (i.e., the location at which the content can be viewed) "follows" the associated viewer, as appropriate, as they move through the detection region. In the illustrative embodiment, content is not displayed to a viewer while they are moving. Rather, when a viewer interacts with the MVD system at a first location, the system responds by delivering updated content to the viewer for viewing at the first location. When the viewer moves, content delivery to the viewer at that location ceases. When the viewer again stops at a second location and again interacts with the MVD system, the system responds by delivering updated content to the viewer for viewing at the second location.

In some further embodiments, after a viewer's first interaction with the MVD system, content is continuously displayed to the viewer as they move through the detection region. In yet some additional embodiments, after a viewer interacts with the MVD system, content is displayed for a limited period of time (e.g., 5 seconds, 10 seconds, etc.) and/or for a limited distance (i.e., 1 meter, 2 meters, etc.) once the viewer moves from the location of interaction.

As such, in the context of delivering content to a non-stationary viewer, "follow" means that content is delivered to the viewer at more than one location, although not necessarily on a continuous basis.

BRIEF DESCRIPTION OF THE DRAWINGS

FIG. 1C depicts the system of FIG. 1A, wherein the viewers have moved to new locations.

DETAILED DESCRIPTION

Figure 1A:
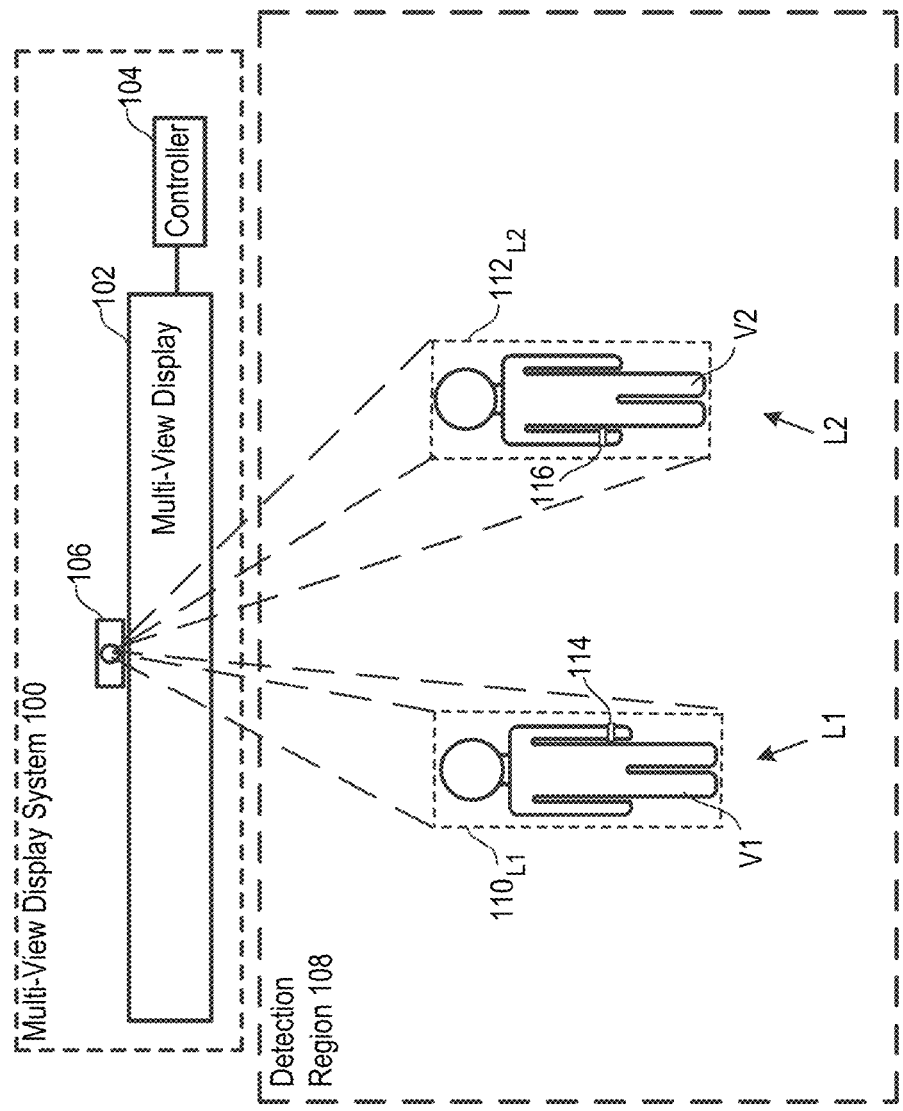
FIG. 1A depicts a multi-view display system capable of updating the location of viewers through a viewing environment, in accordance with the illustrative embodiment of the present invention.
Figure 1B:
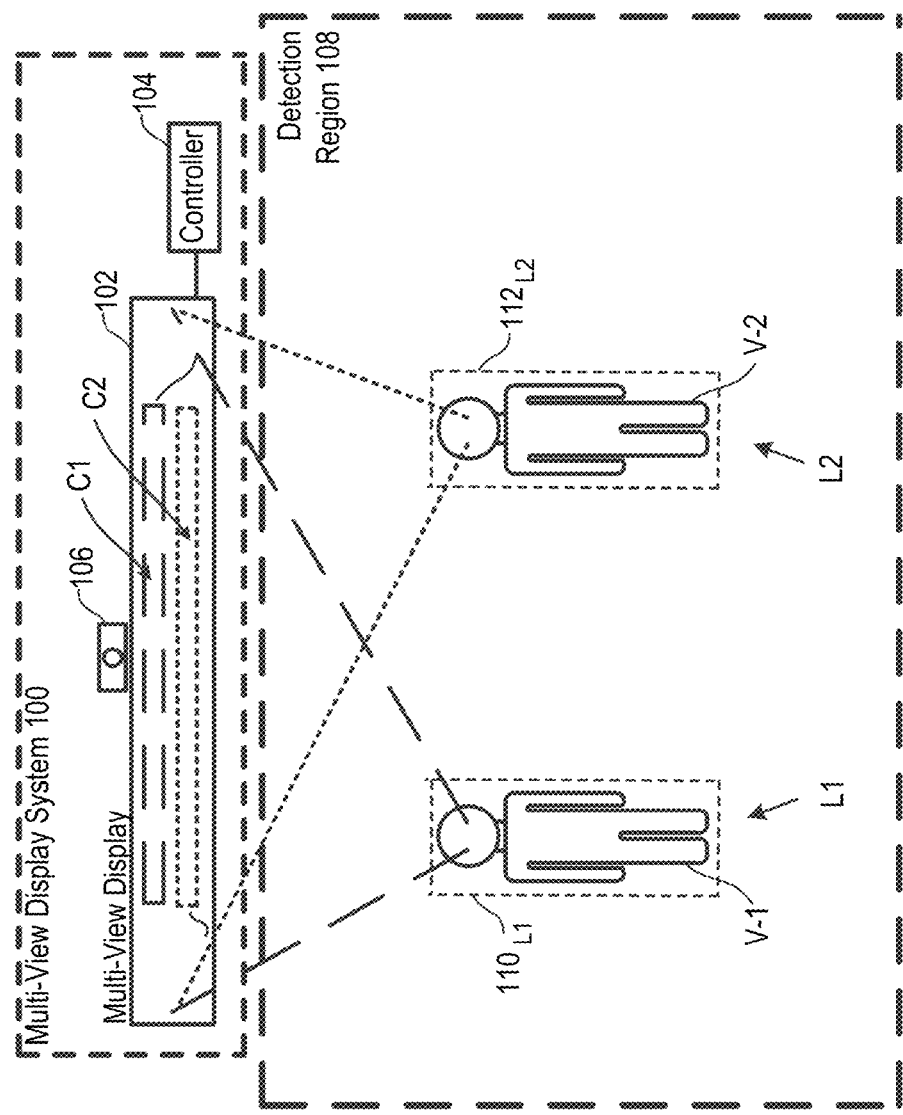
FIG. 1B depicts viewers viewing different content on the system of FIG. 1A.

The terms appearing below and inflected forms thereof are defined for use in this disclosure and the appended claims as follows:
 "acquire" or "capture" refer, in the context of a viewer's gesture, to the process of obtaining digital images or video of the gesture(s) from a sensing system, which typically (but not necessarily) includes a vision sensor, such as a camera.
 "associating," when used in the context of a relationship between a viewer interaction/gesture/communications device and a viewer, means that the viewer interaction or gesture or communications from the communication device are sourced from or otherwise pertain to the viewer.
 "content" means whatever is delivered to a viewer via the MVD. Embodiments of the invention result in an update to content based on a viewer's interaction with the system. In some embodiments, at least some updated content is delivered to a viewer's communications device (e.g., smart phone, tablet, etc.).
 "datum" means an item of information.
 "multi-view display" or "MVD" means a display that is capable of simultaneously presenting a different image to each one of plural viewers that are at different viewing angles (locations) with respect to the MVD. The different images seen by each of such different viewers is displayed in the same location of the display.
Additional definitions may appear throughout the disclosure in context.

MVD system 100, which is depicted in FIGS. 1A-1D, includes MVD 102, system controller 104, and sensing system 106. MVD system 100 is capable of displaying a unique content stream to each viewer in detection region 108. In the illustrative embodiment, each viewer is able to interact with the MVD system by making gestures. The gestures convey a viewer's commands/preferences with respect to content that they wish to view. The gestures are captured by the system, associated with the gesticulating viewer, and interpreted. The MVD system then responds by delivering content to the viewer at the location at which they interact with the system. The various elements of MVD system 100 are now described.

Multi-View Display 102.

MVD 102 is capable of displaying different images to different viewers based on a difference in viewing location. The principle of operation of an MVD is known to those skilled in the art and so will be discussed only briefly. The salient difference between a single view display and a multi-view display is that the former displays the same image to all viewers while the latter is able to display different images to different viewers simultaneously.

Some versions of a multi-view display include one or more projection elements that emit light of different color and brightness at different angles. The projection element includes a light source, an imager, and a lens. Examples of suitable imagers include, without limitation, digital micro-mirror devices, liquid crystals, light emitting diodes, and/or liquid crystal on silicon (LCOS). Each projection element can be considered to be a single pixel of the display, wherein a full graphic multi-view display is formed from an array of such projection elements. In some embodiments, each projection element—each pixel—is controlled by its own processor. In some other embodiments, a processor controls plural projection elements, but less than all of the elements of the display. In some embodiments, all of such processors in the display are connected via a network (e.g., Ethernet, Infiniband, $I^2C$, SPI, Wi-Fi, etc.), or, more generally, a communication channel (e.g., HDMI, etc.).

The light source illuminates the imager and the imager filters or directs the light through the lens. The lens is capable of directing light that is received from different locations of the imager in different directions. For example, a projector with resolution of 1920×1080 is capable of controllably directing light in over two million directions. The color and brightness emitted at each angle is different. Each element, from a viewer's perspective, appears to be a light source of the color and brightness of the light that is projected onto the viewer, even if the projection is too dim for any image to be visible on nearby surfaces. As a consequence, the appearance of each projection element from the perspective of a viewer is dependent upon the angle at which the viewer views the element.

As will be appreciated by those skilled in the art, the foregoing provides a description of one of a variety of different implementations of a multi-view display. Any implementation of an MVD known to those skilled may suitably be used. Furthermore, embodiments of an MVD as disclosed in U.S. patent application Ser. No. 15/002,014, entitled "Method for Calibrating a Multi-View Display," may suitably be used in conjunction with embodiments of the present invention.

Sensing System 106.

In the illustrative embodiment, sensing system 106 provides two basic functions: presence detection/location determination and gesture recognition.

With respect to presence detection or location determination (those phrases are used synonymously herein), sensing system 106 is capable of detecting the presence/determine the location of each of a plurality of viewers, represented in FIGS. 1A through 1D by viewers V1 and V2, in detection region 108. Regarding gesture recognition, sensing system 106 is capable of capturing and interpreting viewer gestures.

In the illustrative embodiment, sensing system 106 is a machine/computer vision system, the key elements of which include an imaging device(s) for image acquisition and software for accomplishing any of various digital image processing techniques for extracting the requisite information. It will be appreciated that in addition to or as an alternative to the imaging device, other devices/techniques can be used for locating a viewer (e.g., RF triangulation techniques, GPS, etc.).

The imaging device(s) typically include one or more cameras as well as lenses and lighting that are designed, collectively, to provide the requisite differentiation that is required by subsequent processing. In some embodiments, the camera(s) is a depth-aware camera, such as structured light or time-of-flight cameras, which can generate a depth map of what is being seen through the camera at a short range, wherein this data is then used to approximate a 3D representation of what is being seen. In some other embodiments, the camera(s) is a stereo camera, wherein, using two cameras whose relations to one another are known, a 3D representation can be approximated by the output of the cameras. Depth-aware and 3D cameras are particularly useful in conjunction with the gesture recognition function of sensing system 106. In some further embodiments, one or more standard 2D cameras are used for image acquisition. In some additional embodiments, the imaging device comprises a radar system. Those skilled in the art will know how to make and/or specify and use various cameras, radar, or other imaging devices for the purposes of presence detection and gesture recognition.

Sensing system 106 can employ conventional (2D visible light) imaging, although other techniques, such as imaging various infrared bands, line scan imaging, 3D imaging of surfaces or other techniques may suitably be used. Those skilled in the art while know how to select and use an appropriate imaging technique in conjunction with embodiments of the invention.

In some embodiments, the imaging device is combined with the image processing unit. In the illustrative embodiment, the imaging device is separate from the image processing unit, the latter of which is implemented by software running on system controller 104.

After an image is acquired, it is processed by any of a number of image processing techniques, including stitching/registration, morphological filtering, thresholding, pixel counting, segmentation, edge detection, blob discovery and manipulation, to a name a few. Such techniques can be used for presence detection/location determination.

There are a variety of techniques, well known in the art, for gesture recognition. Gestures can originate from any bodily motion or state, but typically originate from the hand or face. Most techniques rely on key pointers represented in a 3D coordinate system. Based on the relative motion of these pointers, a gesture can be detected with high accuracy, depending on the quality of the input and the particular algorithm that is applied. Two main approaches for gesture recognition are: 3D-model-based and appearance-based models. The former approach uses 3D information of key elements of body parts in order to obtain several important parameters, such as palm position or joint angles. The 3D-model approach typically uses volumetric or skeletal models, or a combination thereof.

Appearance-based systems use images or videos for direct interpretation. Such models do not use a spatial representation of the body; rather, they derive the requisite parameters directly from the images or videos using a template database. Some are based on the deformable 2D templates of the body parts, particularly hands. Deformable templates are sets of points on the outline of an object, used as interpolation nodes for the object's outline approximation.

Whichever presence detection and gesture recognition algorithms are selected for use, they are implemented as software that, in the illustrative embodiment, is executed by system controller 104.

In some embodiments, sensing system 106 further comprises passive trackable object 114 (FIG. 1A), such as a wrist band, an arm band, eye glasses, or have some other suitable form factor (e.g., wearable, readily carried, etc.) for accompanying anyone wishing to interact with MVD system 100. Passive trackable object 114 functions as an extension of the body; that is, it is intended, by virtue of its design, to emphasize a gesturing body part (e.g., hand, arm, head, etc.) by making that part more distinguishable from its surroundings that it would otherwise be. Doing so simplifies presence detection and/or gesture recognition (e.g., by improving "resolution" of an acquired image, reducing processing requirements, etc.). In some embodiments, this is accomplished by imbuing passive trackable object 114 with certain surface characteristics (e.g., color, reflectivity, etc.) that render it readily trackable and distinguishable from other surfaces in detection region 108.

In some further embodiments, sensing system 106 further comprises active trackable object 116 (FIG. 1A), which, like passive trackable object 114, can also be in the form of a wrist band, arm band, etc. Unlike the passive trackable object, active trackable object 116 includes sensors that capture a viewer's gestures and a wireless transceiver for transmitting data related to the gestures to other elements of sensing system 106 for further processing. Such sensors include, for example, MEMS accelerometers, MEMS gyroscopes, and the like. Any of a variety of short range wireless protocols (Bluetooth, WiFi, etc) may suitably be used for communication. In some embodiments, the object 116 includes onboard processing of the data acquired by the sensor. In such embodiments, active trackable object 116 can transmit an interpretation of the gesture or perform some preliminary data processing toward that end, which is then completed by software running on system controller 104. In some other embodiments, active trackable object 116 transmits raw (unprocessed) data from its sensor(s) to other elements of sensing system 106.

It is notable that both passive trackable object 114 and active trackable object 114 can be used for detection/location purposes. For such uses, these objects can be in the form of a badge or sticker, in addition to a wrist band, arm band, etc.

System Controller 104.

Figure 7:
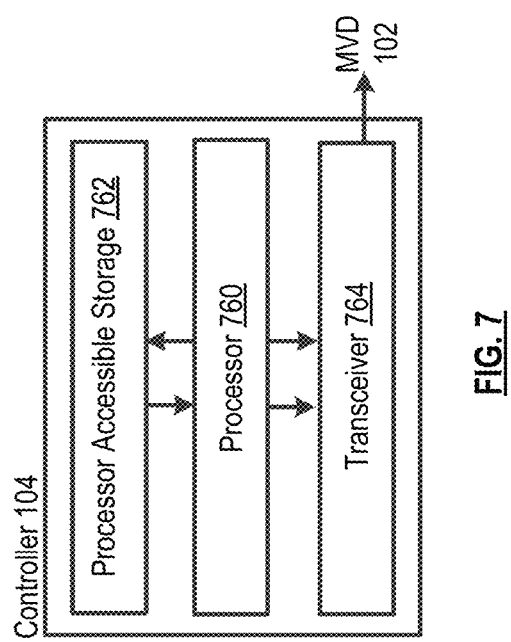
FIG. 7 depicts a block diagram of a system controller of the multi-view display system of FIGS. 1A and 1B.

System controller 104, which is depicted in greater detail in FIG. 7 includes processor 760, processor-accessible data storage 762, and transceiver 764.

In the illustrative embodiments, controller 306 executes specialized application software to determine viewing location and viewing preferences from viewer gestures. In some other embodiments, one or both of those functions are performed by other processors/computers. In such embodiments, controller 306 simply receives a command to cause the MVD to display a specific image to a specific viewing location. The operation of system controller 312 is discussed in further detail in U.S. patent application Ser. No. 15/002,014, entitled "Method for Calibrating a Multi-View Display," previously referenced.

Processor 760 is a general-purpose processor that is capable, among other tasks, of running an operating system, executing device drivers, and populating, updating, using, and managing data in processor-accessible data storage 762. Processor 760 is also capable of executing specialized application software for performing tasks such as those depicted in FIG. 2, either alone or in conjunction with other elements of MVD system 100. In some alternative embodiments of the present invention, processor 760 is a special-purpose processor. It will be clear to those skilled in the art how to make and use processor 760.

Processor-accessible data storage 762 is non-volatile, non-transitory memory technology (e.g., ROM, EPROM, EEPROM, hard drive(s), flash drive(s) or other solid state memory technology, CD-ROM, DVD, etc.) that store, among any other information, data, device drivers (e.g., for controlling MVD 102, etc.), and specialized application software, which, when executed, enable processor 760 and MVD 102 to perform the methods disclosed herein. It will be clear to those skilled in the art how to make and use processor-accessible data storage 762.

Transceiver 764 enables, in some embodiments, one or two-way communications with viewer-provided communications devices or other elements of the MVD system 100 via any appropriate medium, including wireline and/or wireless, and via any appropriate protocol (e.g., Bluetooth, Wi-Fi, cellular, optical, ultrasound, etc.). The term "transceiver" is meant to include any communications means and, as appropriate, various supporting equipment, such as communications ports, antennas, etc. It will be clear to those skilled in the art, after reading this specification, how to make and use transceiver 764.

Figure 1D:
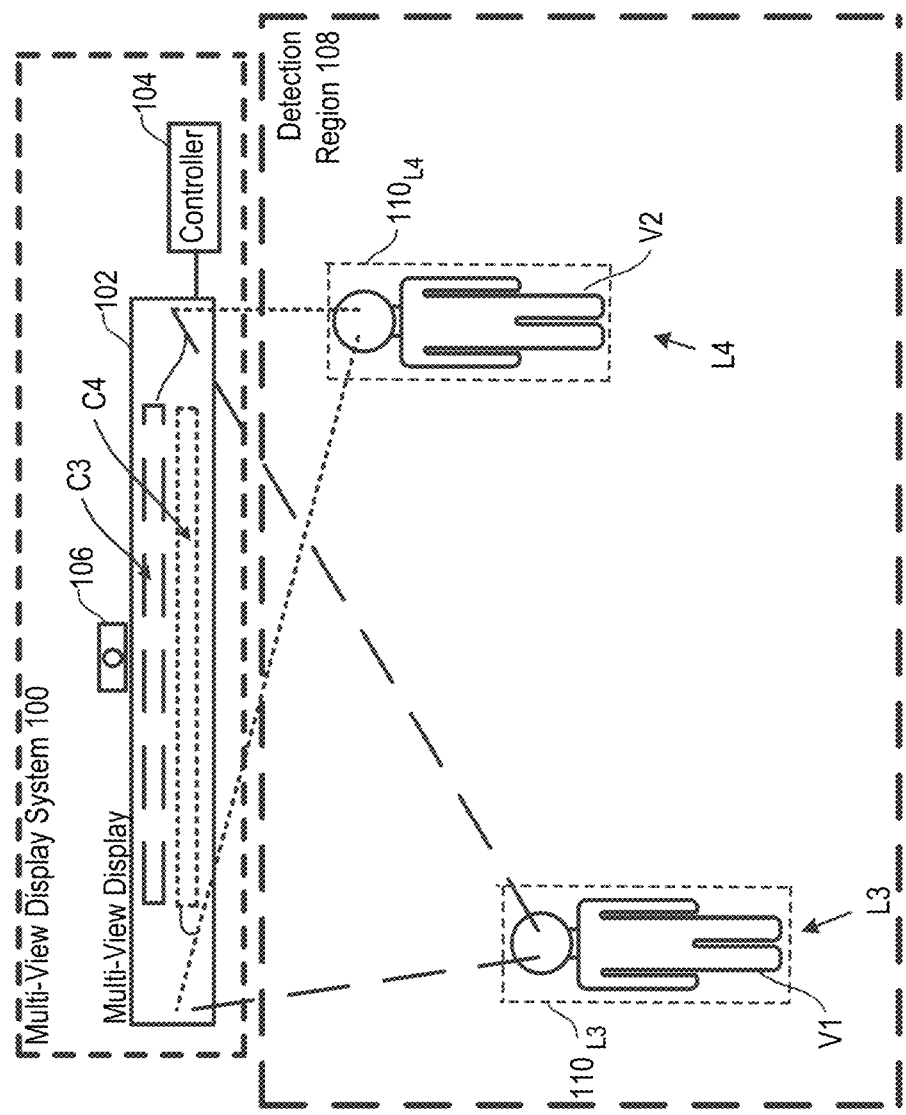
FIG. 1D depicts viewers viewing different content on the system of FIG. 1A.
Figure 2:
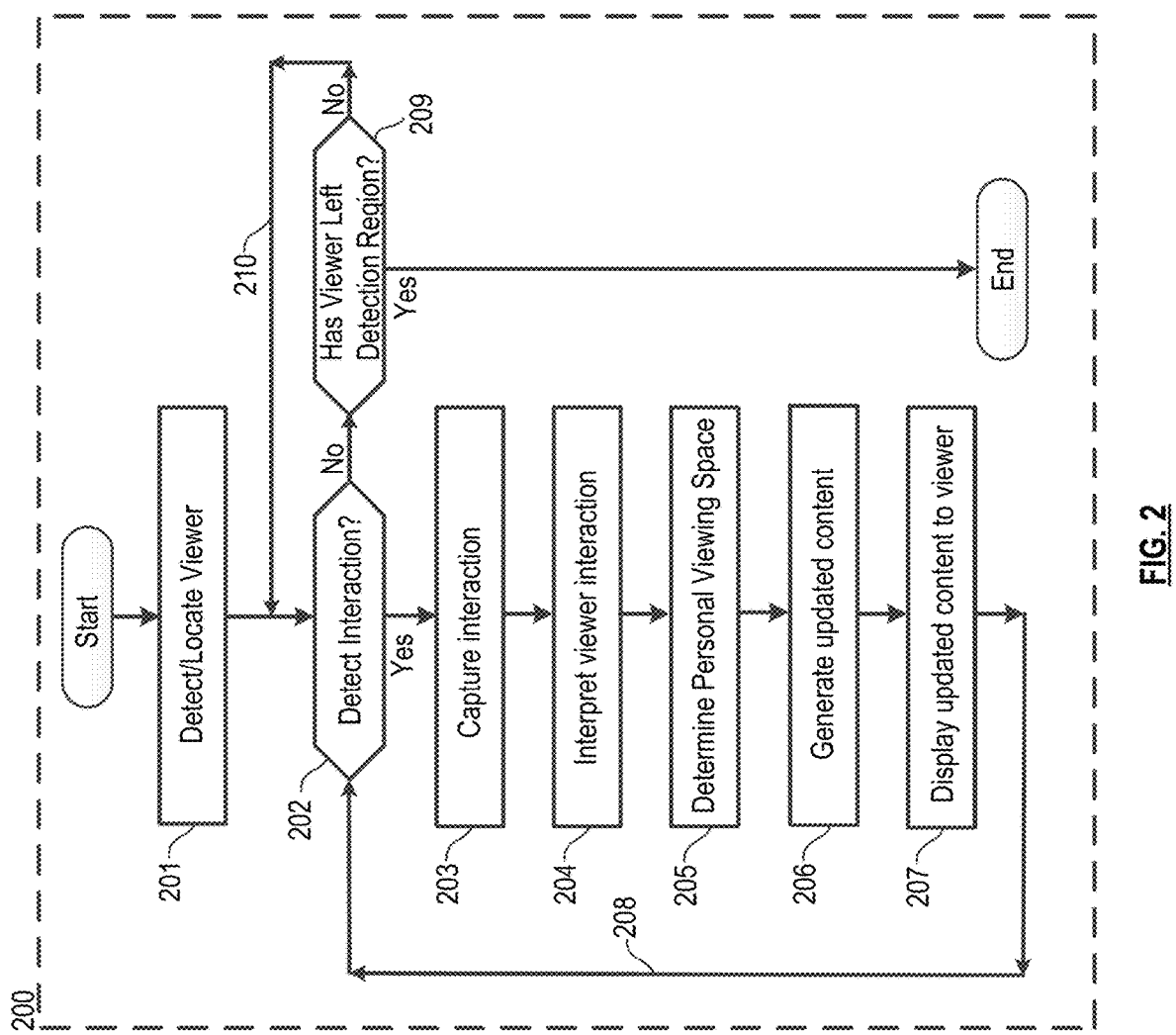
FIG. 2 depicts a block diagram of a method for operating a multi-view display system.

FIG. 2 depicts method 200 in accordance with the illustrative embodiment of the invention. It is notable that some of the operations/tasks of method 200 that are depicted as being distinct (e.g., tasks 202 and 203) would not necessarily be so. They should thus be understood as "logical" tasks, shown as being distinct for pedagogical purposes. Furthermore, the sequence in which the tasks appear is permutable; for example, task 205 (determining of personal viewing space) can be performed before task 204, task 206 (generating updated content) can be performed before task 205, etc. It will be apparent to those skilled in the art how the sequence of tasks can be altered. Additionally, method 200 will be discussed in conjunction with FIGS. 1A through 1D, which depict two viewers V1 and V2. It is to be understood that MVD system 100 is capable performing method 200 for many more viewers (limited primarily by the size and resolution of the display and the size of the viewing area) simultaneously.

In task 201 of method 200, the MVD system detects/locates viewers as they enter detection region 108. Referring again to FIGS. 1A through 1D, sensing system 106 detects/locates viewers V1 and V2.

At task 202, query whether viewers are interacting (e.g., gesticulating, speaking, etc.) with MVD system 100. If so, the interactions are captured, per task 203. In the illustrative embodiment, the interactions are gestures, which are captured via sensing system 106. For example, a viewer might wave their hand from right to left (to indicate, for example, a desire to replay an earlier moment in a content stream that they are viewing). It is notable that MVD system 100 associates each gesture with its source; that is, a particular viewer. This is typically accomplished by assigning an identifier to each detected viewer and associating the gesture with the identifier corresponding to the viewer from which the gesture is sourced. As discussed later in conjunction with FIG. 4, the viewer interaction can be the viewer speaking commands/preferences. In such an embodiment, sensing system 106 includes microphones.

Per task 204, the captured interactions are interpreted. In the illustrative embodiment, this task requires gesture recognition, which is performed via gesture recognition software that is running, for example, on system controller 104. Once the interaction is interpreted by the software, MVD system 102 associates the interaction with particular commands or viewer preferences pertaining to the content that they wish to view. In some embodiments, a look-up table provides the requisite association between a given gesture and the command/preference that it's intended to convey.

In accordance with task 205, a personal viewing space for each viewer (at least those that interacted with MVD system 100) is determined. A viewer's personal viewing space is the region of space in which updated content that is to be delivered to the viewer (i.e., based on interpreted gestures) is viewable. A viewer's personal viewing space is a function of the viewer's location with respect to MVD 102 within detection region 108. Since in the illustrative embodiment the viewer is not stationary, neither is the personal viewing space; it moves with the viewer.

Ideally, the personal viewing space is small enough so that the only viewer that will see the content displayed by MVD 102 is the viewer for whom the content is intended. Typically, the only viewing perspective from which content needs to be viewable to a viewer is from that of the viewer's eyes. However, in the illustrative embodiment, the personal viewing space covers a viewer's complete body; this reduces computational overhead related to image processing. See, for example, FIG. 1A, depicting personal viewing space $110_1$ of viewer V1 and personal viewing space $112_{12}$ of viewer V2. As indicated above, the personal viewing space moves with the viewer. In FIG. 1C, viewer V1 has personal viewing space $110_{13}$ after moving from location L1 (FIG. 1A) to location L3. And viewer V2 has personal viewing space $112_{14}$ after moving from location L2 (FIG. 1A) to location L4.

In task 206, updated content is generated based on the interpreted viewer interaction. In the illustrative embodiment, this is performed by system controller 104.

In task 207 of method 200, the system causes updated content to be displayed to the viewer. Such content is viewable at the viewer's personal viewing space. For example, in FIG. 1B, viewer V1 sees, from personal viewing space $110_1$, content C1 projected by MVD 102. Viewer V2 sees, from personal viewing space $112_{12}$, content C2 projected by MVD 102. Depending on the status of viewers V1 and V2, the content being viewed might be preliminary information pertaining to the use of the system (e.g., how to gesture to provide commands to the system, etc.) or, if they have been interacting with the system, content C1 is updated content based on viewer V1's interaction with MVD system 100 and content C2 is updated content based on viewer V2's interaction with MVD system 100. In the illustrative embodiment, system controller 104 directs the operation of MVD 102 to display the appropriate content.

It is notable that content C1 and C2 can be displayed in the same region of MVD 102 (they are shown at different regions in the Figures for clarity of illustration) for viewing by respective viewers V1 and V2 that have different viewing angles with respect to MVD 102.

Returning to method 200, processing loops back at 208 and queries whether any (further) interactions are detected. If so, tasks 203 through 207 are repeated such that updated content is presented to the viewer. For example, in FIG. 1C, wherein time has elapsed relative to FIG. 1A, viewers V1 and V2 have moved from respective locations L1 and L2 to respective locations L3 and L4 and are assumed to have interacted with the system. Based on that interaction, new content is generated (task 206) and is displayed by MVD 102. As depicted in FIG. 1D, updated content C3 is displayed via MVD 102 for viewing at personal viewing space $110_{L3}$ of viewer V3. Likewise, updated content C4 is displayed via MVD 102 for viewing at personal viewing space $112_{14}$ of viewer V2.

In the illustrative embodiment, content is not displayed to a viewer while they are moving. For example, in FIG. 1C, viewer V1 has moved to location L3 and viewer V2 has moved to location L4. Once viewer V1 moved from location 11 and viewer V2 moved from location L2, the system stopped delivering content to them. However, at their new locations L3 and L4, the viewers interact with MVD system 100 and, in accordance with method 200, the system then delivers updated content C3 to viewer V1 and updated content C4 to viewer V2. In some other embodiments, content is displayed to a viewer continuously.

Returning to task 202, if an interaction is not detected, query at task 209 whether the viewer has left the detection region. If so, then the method terminates for that viewer. If the viewer is still present, processing loops back at 210 to task 202.

Figure 3A:
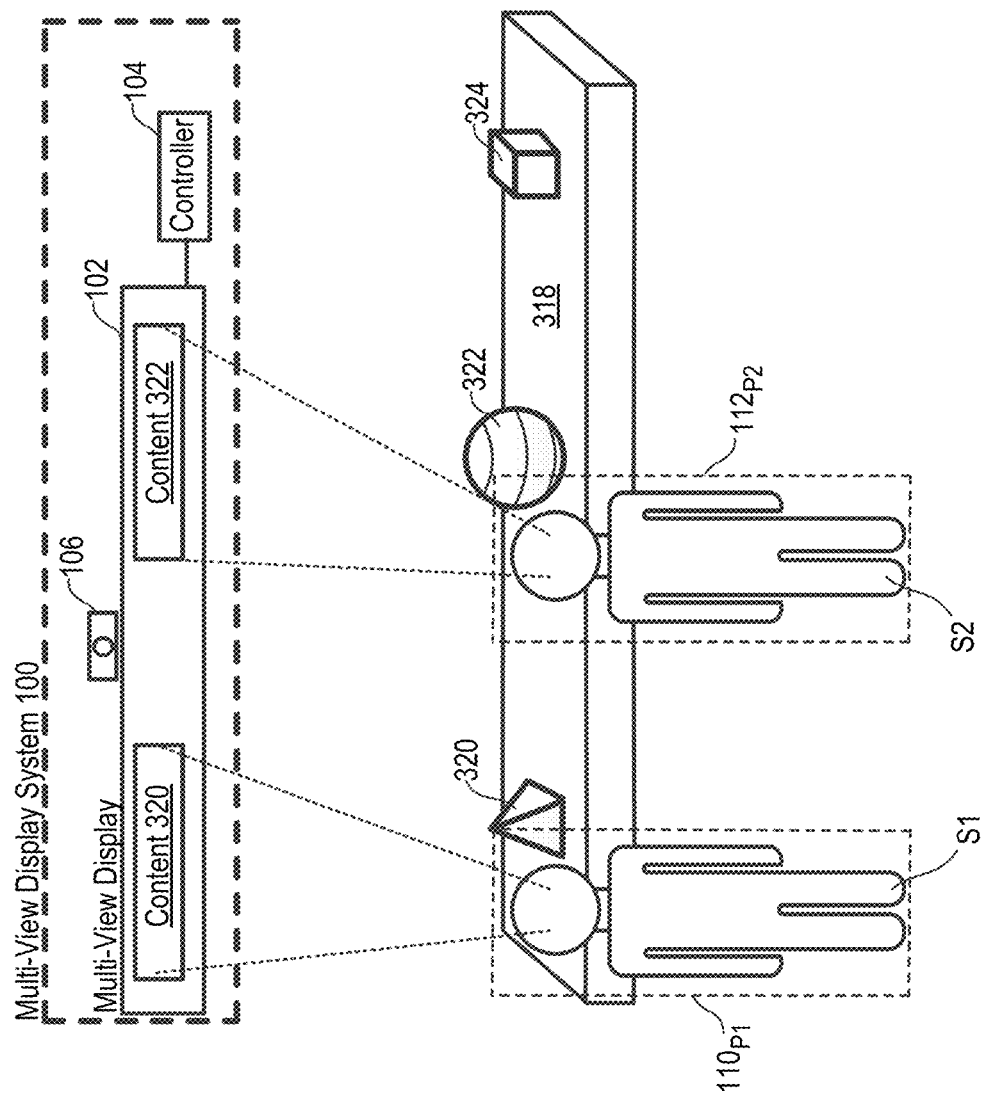
FIG. 3A depicts the system of FIGS. 1A and 1B in use in conjunction with a product display, wherein viewers are in a first position.
Figure 3B:
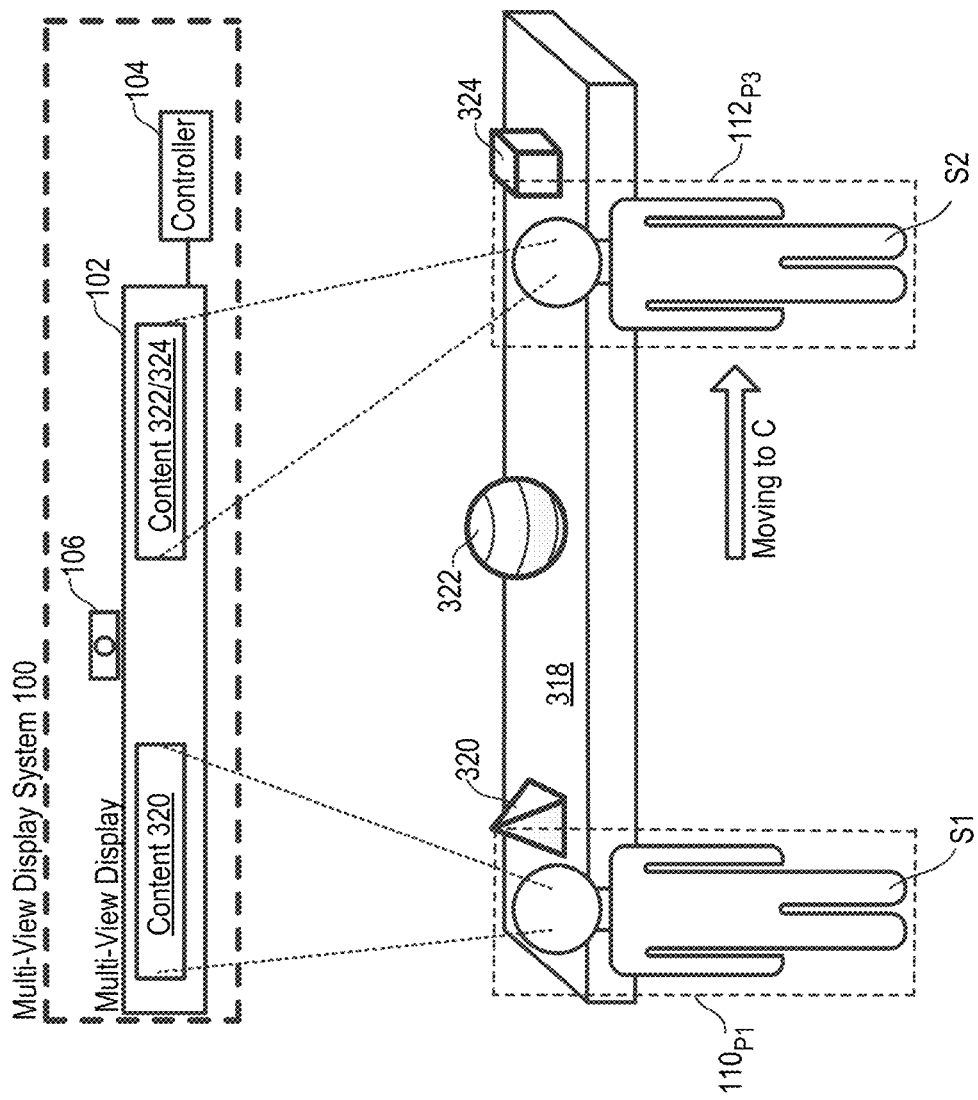
FIG. 3B depicts the arrangement depicted in FIG. 2A wherein one of the viewers has moved to a second position.

FIGS. 3A and 3B depict MVD system 100 used in conjunction with a product sample display. Product sample displays are commonly used to sell personal electronics and other goods since they permit the consumer to closely examine the products before purchase. Such displays present challenges for retailers; there is usually very limited space for signage to advertise the features of each product. This problem is addressed via embodiments of the present invention, wherein a single MVD simultaneously displays targeted content to each of plural shoppers.

FIG. 3A depicts shopper S1 examining product 320 and shopper S2 examining product 322 on product display 318. MVD 102 displays Content 320 for viewing at personal viewing space $110_{P1}$ of shopper S1 and displays Content 322 for viewing at personal viewing space $112_{P2}$ of shopper S2. The system performs method 200, previously discussed, to provide content updates to the shoppers. In this scenario, the "interaction" indicative of a command/preference pertaining to content is the shopper moving close to a particular product on display 318. That is, the movement towards the product, or the viewer's presence near a product, is a "gesture" that can be interpreted by the system. In particular, since shopper S1 is standing in front of product 320, MVD system 100 displays content related to product 320 to shopper S1. Likewise, since shopper S2 is standing in front of product 322, MVD system 100 displays content related to product 322 to shopper S2.

Of course, other gestures could be used to convey product interest. For example, reaching a hand toward a particular product, rather than standing in front of it, is an interaction that could trigger content pertaining to that product. Alternatively, standing in front a product could result in the display of a first level of product information to a shopper, while reaching for or handling the product could result in a content update, wherein additional product information is provided. With respect to handling a product, the use of additional sensors, such as a switch that detects when a product is lifted for examination, or inertial sensors on a product that can detect movement and/or orientation, can be used to generate appropriate content for display. When such additional product sensors are used, signals from the sensors must be associated with a particular user. In some embodiments, this is done by correlating the location of the shoppers, as determined via sensing system 106 or other location determining system, with the activated sensor (which is pre-associated with the particular product).

The history of a viewer's interactions with MVD system 100 can be used in conjunction with content updates. For example, consider FIG. 3B, wherein shopper S2 moves from a location in front of product 322 (FIG. 3A) to a location in front of product 324. In response to this movement, and based on the fact that shopper S2 was formerly in front of product 322, MVD 102 now displays, to personal viewing space $112_{P3}$ of shopper S2, updated content pertaining to both products 322 and 324.

Figure 4:
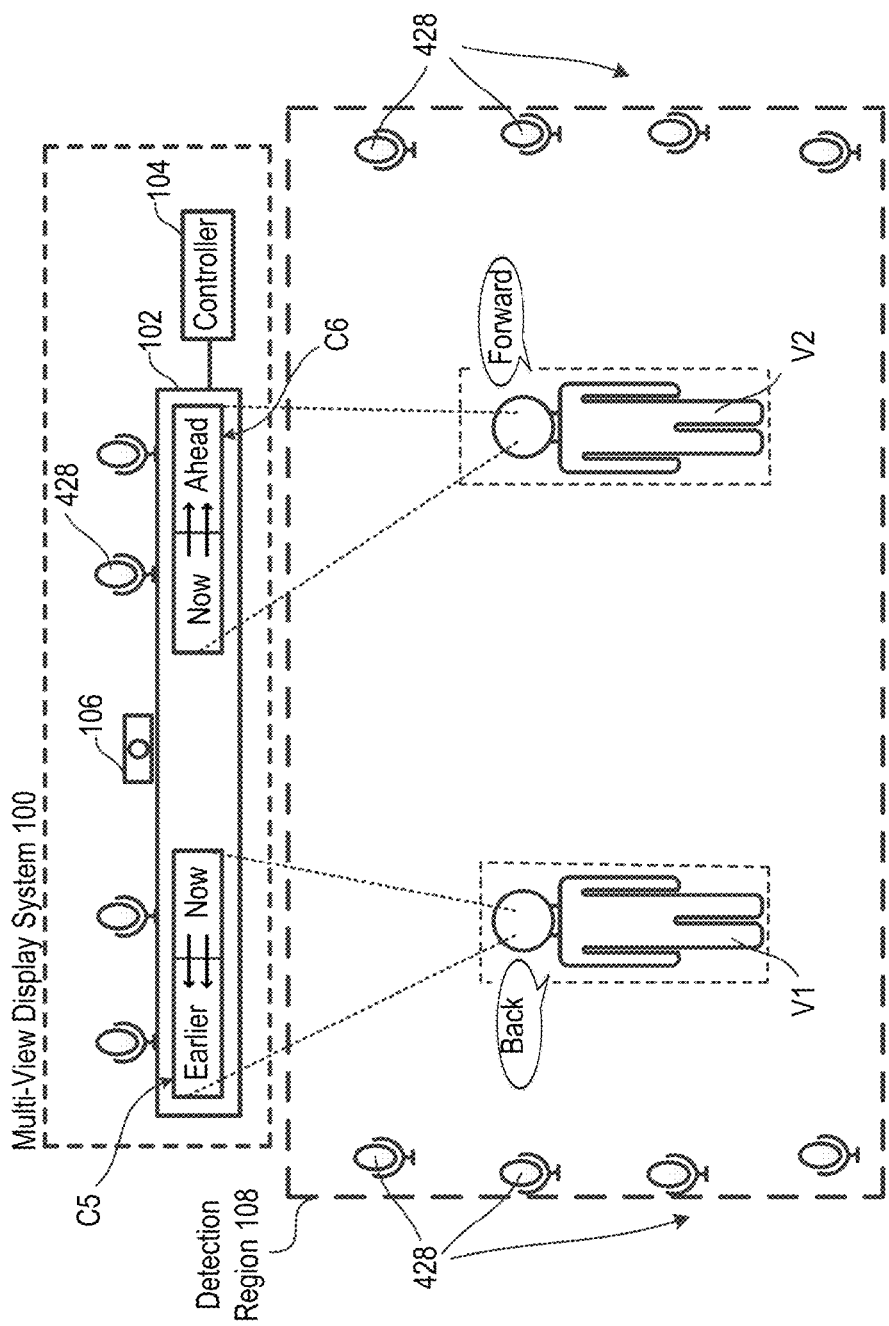
FIG. 4 depicts an alternative embodiment of the multi-view display system of FIGS. 1A and 1B, wherein a sensing system of the multi-view display system includes microphones.

FIG. 4 depicts an embodiment of MVD system 100 wherein the sensing system further comprises a plurality of microphones 428. In such an embodiment, a viewer/shopper can simply speak commands/preferences to interact with MVD system 100. That is, the "interaction" is the viewer speaking to the system. For example, viewer V1 can say "back" to cause content stream C5 to repeat content that was already displayed. Or a viewer, such as viewer V2, can say "forward" to cause content stream C6 to jump ahead. In such an embodiment, rather than using image processing in conjunction with the interaction (i.e., to decode a gesture), a speech processor is used (i.e., to decode the verbal commands).

It will be appreciated by those skilled in the art that to associate a verbal command with a viewer: (1) microphones 428 must determine the source (location in space) of a verbal command and (2) the location as determined by microphones 428 must be registered/calibrated with a location (e.g., of the viewer, etc.) determined by image processing (so that the system knows how a location determined by the microphones relates to MVD 102). As long as the acoustically determined location and the optically determined location are "calibrated" with one another, the system can determine which viewer (i.e., viewer V1 or V2 in FIG. 4) is the source of a particular command. Techniques for performing such registration/calibration are well known in the art.

Figure 5:
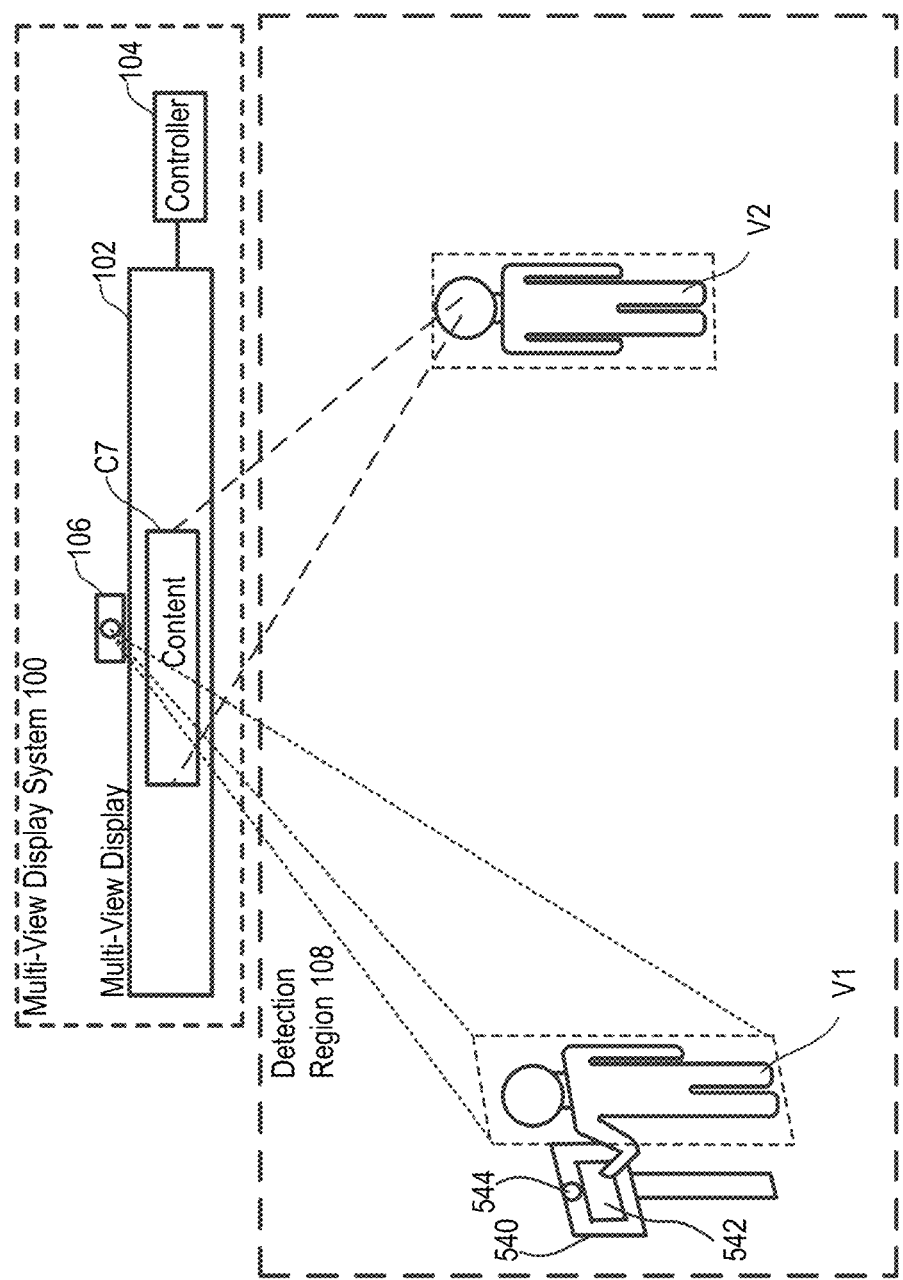
FIG. 5 depicts an alternative embodiment of the multi-view display system of FIGS. 1A and 1B, wherein an installed communications system is used.

FIG. 5 depicts an embodiment of MVD system 100 wherein installed communications system 540 enables viewers to provide certain identifying information to the MVD system. Viewer V1 enters identifying information into user interface 542 appearing in a display of installed communications system 540; viewer V2 has already entered such information. For example, viewer V1 can input information that identifies herself as a member of certain rewards programs, an exclusive shopping club, as having certain interests (e.g., sports, electronic equipment, books, etc.), and the like.

It will be appreciated that MVD system 100 must be able to detect and "identify" each viewer that inputs information, so that such information is associated with the appropriate viewer. In this context, the term "identify" does not mean that the system must know the precise identity (i.e., the name) of the viewer. Rather, "identify" means that to the extent sensing system 106 detects a "blob" (such as via a blob detection technique) in detection region 108, the system must be able to repeatedly associate that particular blob with the information that was input by the particular viewer. That is, the system must be able to identify, on an ongoing basis, any given blob as the blob associated with certain information (as input by a particular viewer).

In the embodiment depicted in FIG. 5, the installed communications system is located within detection region 108, such that sensing system 106 can detect and identify viewer V1 in the manner of previously discussed embodiments. In some other embodiments, camera 544 in installed communications system 540 can perform the detection/identification functions in conjunction with appropriate software. The information received by installed communications system 540 is transmitted, either wirelessly or via wireline, to system controller 104 for use in content generation.

Once a viewer, such as viewer V2, has input identifying or preference information into installed communications system 540, content, such as content C7, can be provided to the viewer as they move through detection region 108. The presentation of content can be triggered, for example, by a viewer's location (e.g., as being near a particular retail establishment, etc.) or by their interactions with the system, in the manner previously discussed.

Although FIG. 5 depicts a single MVD 102 and sensing system 106, in some embodiments, MVD system 100 includes multiple MVDs and multiple sensors (providing a distributed sensing system or multiple sensing systems), thereby establishing plural detection regions and displays for content distribution located throughout an environment, such as a shopping mall, etc.

Figure 6:
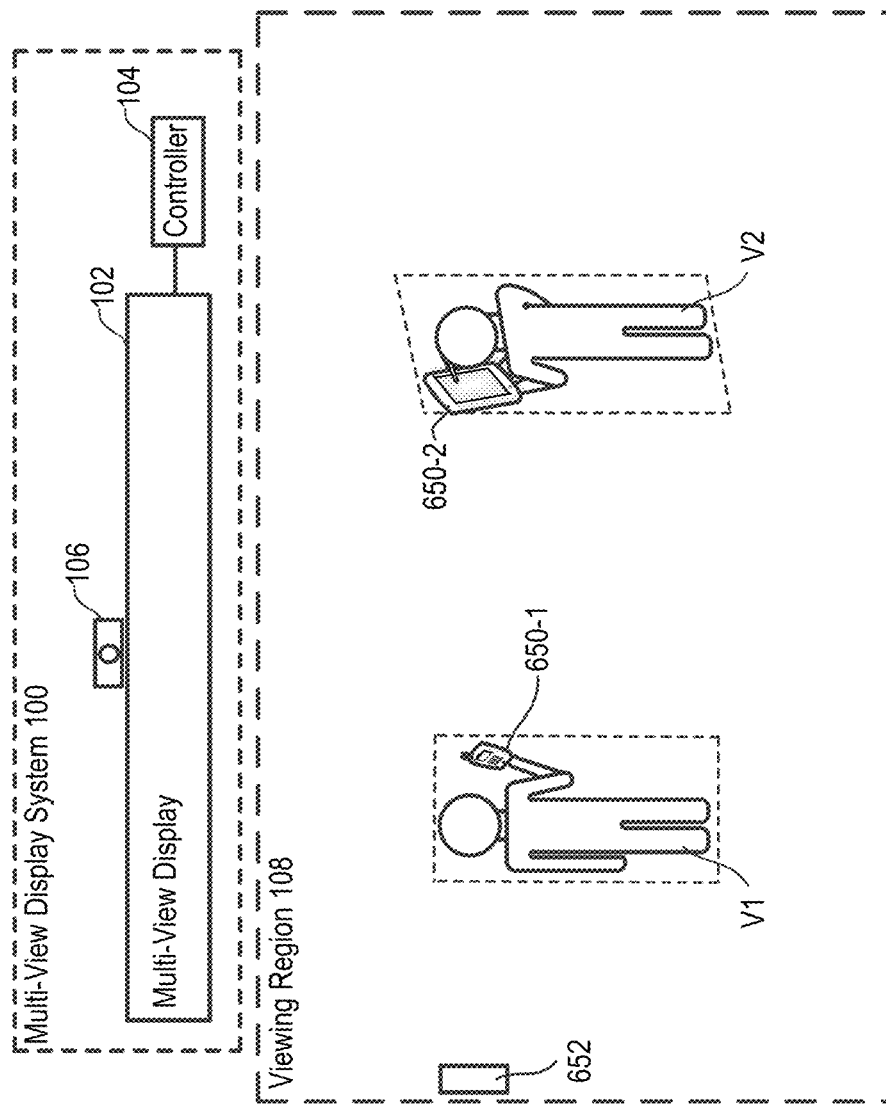
FIG. 6 depicts an alternative embodiment of the multi-view display system of FIGS. 1A and 1B, wherein a viewer-provided communications device with interface application is used.

FIG. 6 depicts an embodiment of MVD system 100 wherein at least some interaction between a viewer and the system is implemented via a viewer-provided communications device, such as smart phone 650-1, tablet 650-2, computerized eyewear, etc. Such devices include a variety of input and output devices by which a viewer can interact with MVD system 100 to affect the type of content presented.

For example and without limitation, a touch screen display of the communications device can be manipulated to select among various content-related options, an inertial measurement unit or camera can be used to facilitate gestural input by moving the communications device, the microphone of the communications device can be utilized for voice input. Other non-limiting examples of interactions with viewer-provided communications device include:

content navigation, wherein the viewer can use the communications device to navigate through the content seen by that viewer;

content download, wherein the viewer can download content related to what is displayed via MVD 102, such as downloading a coupon for a displayed item for sale, downloading a map showing the location of an item displayed via MVD 102, etc.;

identification, wherein the viewer can indicate membership in a particular group and select content on that basis. For example, a viewer might identify herself as a fan of a particular designer, and the system will cause MVD 102 to display content based on that interest; and tagging, wherein a viewer collects pointers to content for later review or for sharing on social media, or wherein a viewer leaves comments on social media that can then be viewed by others when viewing the particular MVD 102 or related displays. In some embodiments, access to such comments is moderated by existing social networks—for example, sharing comments with friends only, etc.

The location of the communications device must be registered/correlated with the viewer so that the MVD system knows that information it receives from the communications device (based on the viewer's interaction therewith) pertains to the particular viewer. As such, sensing system 106 includes devices/techniques for locating people as well as their communications devices. Devices/methods for locating individuals have been previously discussed. Device/methods for locating a communications device include, without limitation, cross-motion analysis (i.e., correlate data from inertial sensors in the communications device with motion of the viewer, as obtained via the sensing system); GPS; Bluetooth tag or i-beacon for ranging; WiFi triangulation; acoustic triangulation using microphones; presenting, via MVD 102, a display code to a viewer, wherein the display code is then input into the communications device and transmitted back to the MVD system 100 (this technique is disclosed in further detail in U.S. patent application Ser. No. 15/002,164 entitled "Individually Interactive Multi-View Display System and Methods Therefor".

It is to be understood that the disclosure teaches just one example of the illustrative embodiment and that many variations of the invention can easily be devised by those skilled in the art after reading this disclosure and that the scope of the present invention is to be determined by the following claims.

What is claimed:

1. A method for operating a system including a multi-view display, wherein the multi-view display is visible in a viewing area comprising a plurality of viewing zones, the method comprising:
   detecting a presence and determining a location of a plurality of viewers, including a first viewer and a second viewer, in the viewing area of the multi-view display, wherein a location of each viewer in the viewing region at any moment defines, for each viewer, a personal viewing zone;
   detecting a first interaction of the first viewer with the system and a second interaction of a second viewer with the system, wherein detecting the first interaction and second interaction comprises capturing, via a sensing system, gestures performed by respective first and second viewers, wherein the gestures represent at least one of a command and a preference of each of the first and second viewers pertaining to content, which can be different for each of the first and second viewers;
   generating first content based on the first interaction and second content based on the second interaction;
   displaying, via the multi-view display, the first content to the first viewer and the second content to the second viewer, wherein the first content is viewable only in the first viewer's personal viewing zone and the second content is viewable only in the second viewer's personal viewing zone.

2. The method of claim 1 further comprising updating the location of the first viewer and the second viewer.

3. The method of claim 2 further comprising ceasing to display the first content to the first viewer when the first viewer is moving.

4. The method of claim 2 and further wherein the first content is associated with a first viewing zone, the method further comprising continuing, for at least one of a limited period of time and a limited distance, to display the first content to the first viewer when first viewer moves away from the first viewing zone.

5. The method of claim 2 wherein associating the first interaction with the first viewer further comprises associating the first interaction with a viewer-provided communications device in the possession of the first viewer.

6. The method of claim 1 wherein the location of each viewer is determined via a sensing system.

7. The method of claim 6 wherein the sensing system comprises an imaging device and a passive trackable object.

8. The method of claim 1 wherein the viewing zones are characterized by a viewing-zone coordinate system, and wherein the multi-view display emits a plurality of beamlets characterized by a beamlet coordinate system, the method further comprising:
   calibrating the multi-view display by generating a relationship between the viewing zone coordinate system and the beamlet coordinate system, wherein the relationship determines which beamlets of the plurality thereof are emitted from the multi-view display to present content to a specified viewing zone in the viewing area.

9. The method of claim 1 wherein generating first content based on the first interaction further comprises interpreting the gestures to determine the command or preference pertaining to content.

10. The method of claim 1 and further wherein the first gesture comprises the first viewer's presence in a sequence of locations.

11. The method of claim 10 wherein interpretation of the first gesture is based on an order in which locations in the sequence are visited by the first viewer.

12. The method of claim 10 wherein interpretation of the first gesture is based on specific locations in the sequence.

13. The method of claim 1 wherein the sensing system comprises a passive trackable object and the gesture comprises moving the passive trackable object.

14. The method of claim 1 wherein the first content is associated with a first viewing zone and the second content is associated with a second viewing zone, the method further comprising:
displaying, on the multi-view display, the first content for viewing by the first viewer when the first viewer is at the first viewing zone; and
displaying, on the multi-view display, second content for viewing by the second viewer when the second viewer is at the second viewing zone.

15. The method of claim 14 wherein when the first viewer moves from the first viewing zone to the second viewing zone, the method further comprises displaying, on the multi-view display, third content for viewing by the first viewer, wherein the third content pertains to the first content and the second content.

16. The method of claim 15 wherein first content pertains to a first product and the second content pertains to a second product.

17. The method of claim 16 wherein the third content is a comparison of the first product and the second product to one another.

18. The method of claim 14 wherein the first content pertains to a first product.

19. The method of claim 18 wherein the first product is situated proximal to the first viewing zone.

20. The method of claim 1 and further wherein detecting the first interaction comprises capturing verbal commands from the first viewer, wherein the verbal commands pertain to content.

21. The method of claim 20 wherein a sensing system comprises a plurality of microphones for capturing the verbal commands.

22. The method of claim 1 and further comprising:
receiving, at a first user interface, first information from the first viewer and second information from the second viewer, wherein the first information is different than the second information;
generating first content based on the first information and second content based on the second information; and
displaying, on the multi-view-display for viewing at a respective personal viewing space of the first viewer and the second viewer, the first content and the second content.

23. The method of claim 22 wherein the user interface comprises a microphone.

24. The method of claim 1 and further comprising:
receiving, for at least some of the viewers of the plurality thereof, respective preference information, wherein the respective preference information is received at plural user interfaces, wherein each one of said some viewers is uniquely associated with one of the plural user interfaces;
generating content based on the received preference information; and
displaying, on the multi-view-display for viewing at a respective personal viewing space of each of said some viewers, the content based on the respective preference information.

25. The method of claim 24 wherein the user interfaces each comprise a microphone.

26. The method of claim 24 wherein the user interface appears in a display screen of a viewer-provided communications device.

27. The method of claim 24 and further comprising interacting with the system via the viewer-provided communications device, wherein interactions are selected from the group consisting of navigating content, downloading second content pertaining to content displayed on the multi-view display, and tagging content.

28. A multi-view display system comprising:
a multi-view display, wherein the multi-view display is visible in a viewing area comprising a plurality of viewing zones characterized by a viewing-zone coordinate system, and wherein the multi-view display emits a plurality of beamlets characterized by a beamlet coordinate system;
a calibration system, wherein the calibration system generates a relationship between the viewing-zone coordinate system and the beamlet coordinate system, wherein the relationship determines which beamlets of the plurality thereof are emitted from the multi-view display to present content to a specified viewing zone in the viewing area;
a sensing system that:
a) detects a presence of viewers in the viewing area, and
b) optically captures interactions of the viewers with the system, wherein the interactions are gestures of the viewers; and
one or more processors that collectively:
a) associate the interactions with individual ones of the viewers, and
b) update, in conjunction with the sensing system, a location of at least some of the viewers, as the viewers move through the viewing area; and
c) command the multi-view display to display content related to the interactions to the associated viewer, wherein the displayed content is viewable only by the associated viewer.

29. The system of claim 28 wherein the location of said some viewers is updated only when viewers interact with the system.

* * * * *